(12) United States Patent
Gotz

(10) Patent No.: US 9,158,854 B2
(45) Date of Patent: *Oct. 13, 2015

(54) METHODS FOR ORGANIZING INFORMATION ACCESSED THROUGH A WEB BROWSER

(75) Inventor: David Gotz, Purdys, NY (US)

(73) Assignee: International Business Machines Corporation, Armonk, NY (US)

( * ) Notice: Subject to any disclaimer, the term of this patent is extended or adjusted under 35 U.S.C. 154(b) by 844 days.

This patent is subject to a terminal disclaimer.

(21) Appl. No.: 13/405,765

(22) Filed: Feb. 27, 2012

(65) Prior Publication Data
US 2012/0158617 A1 Jun. 21, 2012

Related U.S. Application Data

(63) Continuation of application No. 11/780,567, filed on Jul. 20, 2007, now Pat. No. 8,205,166.

(51) Int. Cl.
*G06F 3/048* (2013.01)
*G06F 17/30* (2006.01)

(52) U.S. Cl.
CPC .......... *G06F 17/30884* (2013.01); *G06F 3/048* (2013.01); *G06F 17/3089* (2013.01); *G06F 17/30899* (2013.01)

(58) Field of Classification Search
CPC G06F 3/048; G06F 17/30884; G06F 17/3089
USPC ......................................... 715/769, 781, 853
See application file for complete search history.

(56) References Cited

U.S. PATENT DOCUMENTS

| | | | |
|---|---|---|---|
| 5,694,594 A | 12/1997 | Chang | |
| 6,144,962 A * | 11/2000 | Weinberg et al. | 1/1 |
| 6,184,886 B1 * | 2/2001 | Bates et al. | 715/760 |
| 6,275,862 B1 | 8/2001 | Sharma et al. | |
| 6,356,899 B1 | 3/2002 | Chakrabarti et al. | |
| 6,574,625 B1 * | 6/2003 | Bates et al. | 707/749 |
| 6,665,656 B1 | 12/2003 | Carter | |
| 6,948,118 B2 * | 9/2005 | Genty et al. | 715/207 |
| 7,468,727 B2 | 12/2008 | Wong et al. | |
| 7,707,210 B2 | 4/2010 | Stefik et al. | |
| 2002/0103789 A1 * | 8/2002 | Turnbull et al. | 707/3 |
| 2004/0034637 A1 * | 2/2004 | Riche et al. | 707/9 |
| 2004/0078451 A1 * | 4/2004 | Dietz et al. | 709/217 |
| 2005/0177805 A1 | 8/2005 | Lynch et al. | |
| 2005/0222132 A1 | 10/2005 | Kamal et al. | |
| 2007/0043839 A1 * | 2/2007 | Amadio et al. | 709/222 |

(Continued)

OTHER PUBLICATIONS

T.H. Haveliwala, "Topic-Sensitive PageRank," in Inter. WWW Conf., May 2002, 10 pages.

(Continued)

*Primary Examiner* — Patrick Riegler
(74) *Attorney, Agent, or Firm* — Nidhi Garg; Ryan, Mason & Lewis, LLP

(57) ABSTRACT

Methods are provided for assisting in the organization of information accessed through a web browser. At least one item of information accessed through the web browser is captured and visually represented in a defined organizational area of a display. A relevance index is calculated for each item of information that is visually represented to a current web-browsing behavior. The relevance index is conveyed for each item of information to the current web-browsing behavior to a user of the web browser.

24 Claims, 12 Drawing Sheets

(56) References Cited

U.S. PATENT DOCUMENTS

| | | | |
|---|---|---|---|
| 2007/0129817 A1* | 6/2007 | Cadiz et al. | 700/17 |
| 2007/0266342 A1* | 11/2007 | Chang et al. | 715/810 |
| 2007/0300170 A1 | 12/2007 | Bier et al. | |
| 2008/0052369 A1* | 2/2008 | Weber et al. | 709/217 |

OTHER PUBLICATIONS

R. Kraft et al., "Searching with Context," in Inter. WWW Conf., May 2006. 10 pages.

U. Lee et al., "Automatic Identification of User Goals in Web Search," in Inter. WWW Conf., May 2005, pp. 391-400.

A. Aula et al., "Information Search and Re-Access Strategies of Experienced Web Users," in Inter. WWW Conf., May 2005, pp. 583-592.

A. Faaborg et al., "A Goal-Oriented Web Browser," in ACM CHI, Apr. 2006, 10 pages.

J.J. Garrett, "Ajax: A New Approach to Web Applications," www.adaptivepath.com/publications/essays/archives000385print.php, Feb. 2005, pp. 1-5.

D.M. Russell et al., "The Cost Structure of Sensemaking," in ACM CHI, 1993, 9 pages.

P. Pirolli et al., "Information Foraging," Psychological Review, Jan. 1999, 84 pages.

D. Gotz et al., "A Study of Information Gathering and Result Processing in Intelligence Analysis," in IUI 2006 Workshop on IUI for Intelligence Analysis, 2006, 4 pages.

P. Pirolli et al., "The Sensemaking Process and Leverage Points for Analyst Technology as Identified Through Cognitive Task Analysis," in Inter. Conf. on Intelligence Analysis, 2005, 6 pages.

D. Gotz et al., "Interactive Visual Synthesis of Analytic Knowledge," in IEEE VAST, Nov. 2006, 8 pages.

W. Wright et al., "The Sandbox for Analysis—Concepts and Methods," in ACM CHI, 2006, pp. 1-10.

B. Amento et al., "TopicShop: Enhanced Support for Evaluating and Organizing Collections of Web Sites," in UIST, 2000, 9 pages.

N. Milic-Frayling et al., "WebScout: Support for Revisitation of Web Pages Within a Navigation Session," in IEEE/WIC Inter. Conf. on Web Intelligence, 2003, 5 pages.

N. Jhaveri et al., "The Advantages of a Cross-Session Web Workspace," in CHI Extended Abstracts, Apr. 2005, 4 pages.

T. Hammond et al., "Social Bookmarking Tools (I)—A General Review," in Digital Library Magazine, vol. 11 No. 4, Apr. 2005, pp. 1-23.

M. Dubinko et al., "Visualizing Tags Over Time," in Inter. WWW Conf., May 2006, 10 pages.

G. Rossi et al., "Designing Personalized Web Applications," in Inter. WWW Conf., May 2001, pp. 275-284.

G. Jeh et al., "Scaling Personalized Web Search," in Inter. WWW Conf., 2003, pp. 1-24.

K. Sugiyama et al., "Adaptive Web Search Based on User Profile Constructed Without Any Effort From Users," in Inter. WWW Conf. May 2004, pp. 675-684.

P. Ferragina et al., "A Personalized Search Engine Based on Web-Snippet Hierarchical Clustering," in Inter. WWW Conf., May 2005, pp. 801-810.

Z. Wen et al., "Context-Aware, Adaptive Information Retrieval for Investigative Tasks," in to Appear in Inter. Conf. on IUI, 2007, pp. 122-131.

Google Reader, http://www.google.com/reader/view/, 1 page.

Mindjet Corp., "Mind Manager," www.mindjet.com, 1 page.

i2 Incorporated, "Analysts Notebook," www.i2inc.com, 1 page.

Google Notebook, http://www.google.com/notebook/, 1 page.

British National Corpus, Oxford University Computing Services, "British national corpus," www.natcorp.ox.ac.uk/, 1 page.

* cited by examiner

FIG. 4a
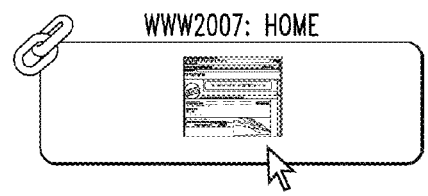
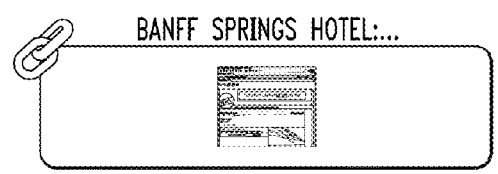
FIG. 4b
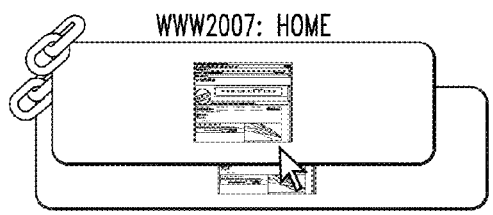
FIG. 4c
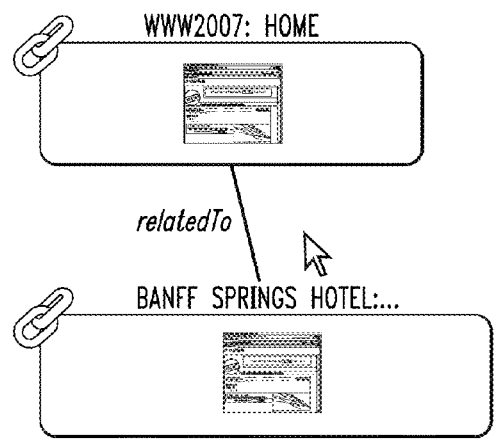

*FIG. 7*

| VARIABLE | DESCRIPTION |
|---|---|
| $C$ | A CONTEXT GRAPH |
| $N_C$ | THE SET OF NODES IN $C$ |
| $n_i$ | AN INDIVIDUAL NODE IN THE SET $N_C$ |
| Type$\{n_i\}$ | THE TYPE OF NODE $n_i$ |
| Id$\{n_i\}$ | THE IDENTIFIER OF NODE $n_i$ |
| Con$\{n_i\}$ | THE CONTENT ASSIGNED TO NODE $n_i$ |
| Edges$\{n_i\}$ | THE SET OF EDGES ASSIGNED TO NODE $n_i$ |
| Sim$\{n_i\}$ | THE SIMILARITY SCORE FOR NODE $n_i$ |
| Rel$\{n_i\}$ | THE RELEVANCE SCORE FOR NODE $n_i$ |
| $E_C$ | THE SET OF EDGES IN $C$ |
| $e_i$ | AN INDIVIDUAL EDGE IN THE SET $E_C$ |
| Nodes$\{e_i\}$ | THE SET OF NODES TO WHICH $e_i$ IS ASSIGNED |
| Type$\{e_i\}$ | THE TYPE OF EDGE $e_i$ |

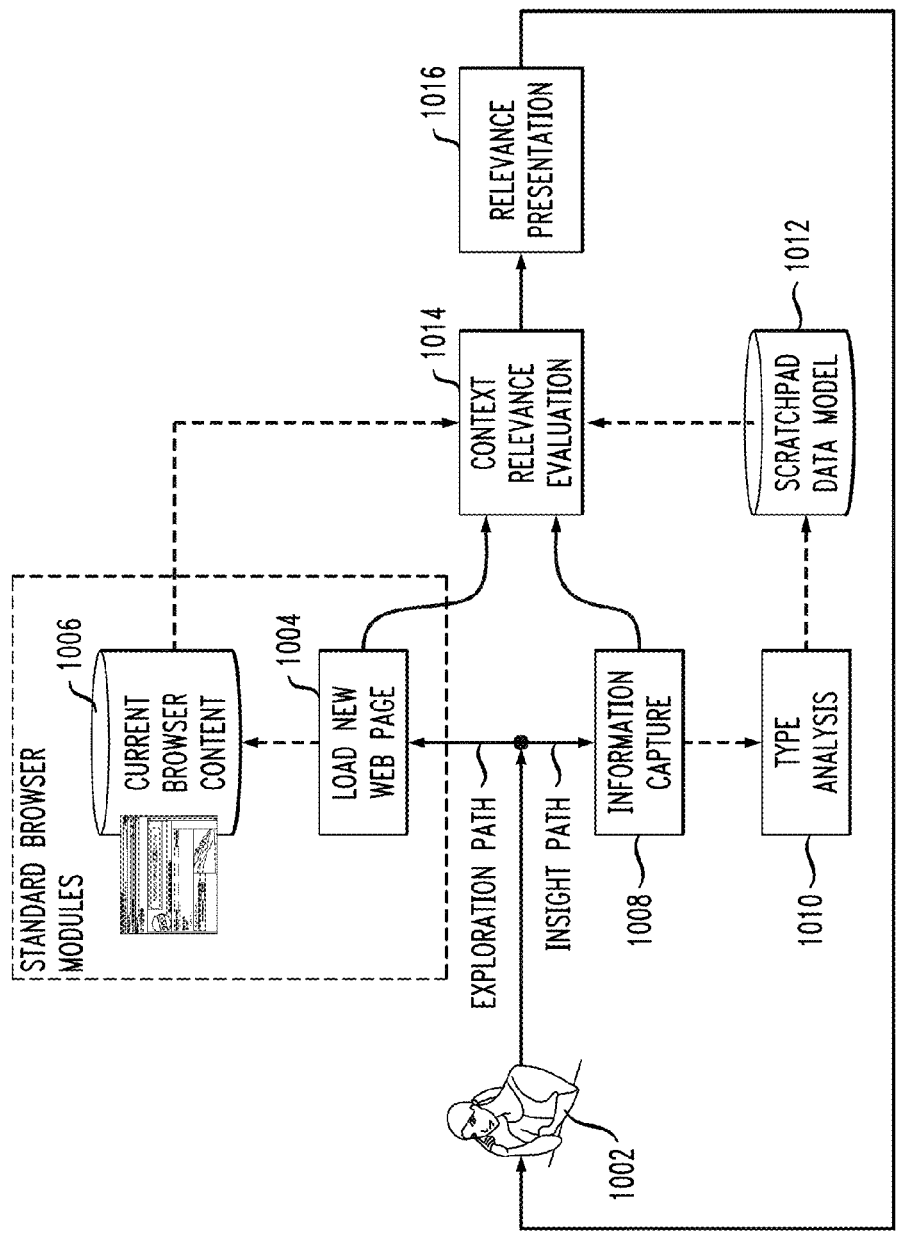

METHODS FOR ORGANIZING INFORMATION ACCESSED THROUGH A WEB BROWSER

CROSS REFERENCE TO RELATED APPLICATIONS

This application is a Continuation of U.S. patent application Ser. No. 11/780,567, filed on Jul. 20, 2007 and now issued as U.S. Pat. No. 8,205,166, the disclosure of which is incorporated by reference herein.

This application is related to U.S. patent application Ser. No. 11/780,570, filed on Jul. 20, 2007, entitled "Techniques for Organizing Information Accessed Through a Web Browser," the disclosure of which is incorporated by reference herein.

FIELD OF THE INVENTION

The present invention relates to web-based applications and, more particularly, methods and apparatus to assist in sensemaking tasks for web-based applications.

BACKGROUND OF THE INVENTION

The World Wide Web provides an extremely rich environment for information exploration and browsing. The dramatic speed of recent improvements in technology and usability has had a widespread effect, impacting nearly every aspect of the web experience. Innovations have resulted in improved accuracy and personalization of search technologies, see, for example, T. H. Haveliwala, "Topic-sensitive pagerank," In Inter. WWW Conf., May 2002; R. Kraft et al., "Searching with context," In Inter. WWW Conf., 2006; and U. Lee et al., "Automatic identification of user goals in web search," In Inter. WWW Conf., 2005. Further, innovations have resulted in increasingly feature-packed web browsers, see, for example, A. Aula et al., "Information search and re-access strategies of experienced web users," In Inter. WWW Conf., 2005; and A. Faaborg et al., "A goal-oriented web browser," In ACM CHI, pp. 751-760, New York, N.Y., USA, 2006, ACM Press. Finally, innovations have resulted in a more interactive and dynamic web user experience, see, for example J. J. Garrett et al., "Ajax: A new approach to web applications," www.adaptivepath.com/_publications/essays/archives/000385.php; and Google Reader, http://www.google.com/reader/view/.

These innovations allow users to perform certain online tasks more easily than ever before. For example, users can easily complete information seeking tasks at the click of a mouse. Store locations, ticket prices, and product information are now easily accessible using modern search engines and a default web browser.

Browsing tasks are also well supported by today's web tools. Web users can leaf through digital product catalogs, browse blogs and news content, or troll through massive video archives thanks to large webs of information built by content providers, or assembled via tagging and other social-based tools.

Additionally, users can purchase books, pay bills, or get driving directions directly from their web browser. These procedural tasks are made possible by web sites designed to support the specific procedural behaviors that are required to perform the task. For example, every user that buys items from Amazon.com will go through a standard "check-out" procedure to complete their transaction.

What have not received as much attention are sensemaking tasks. Sensemaking is a complex behavior where users gather and comprehend information from many sources over many different browsing sessions to answer potentially vague, non-procedural questions. Sensemaking tasks are common and include, for example, researching vacation destinations, deciding how to invest, or choosing where to buy a home. Many professional tasks fall into this category as well, such as open-source business intelligence, criminal and intelligence analysis, and investigative research.

Sensemaking tasks are not well supported with today's web tools. This is in part because they require cross-session, cross-site integration of information which by definition cannot be satisfied by any single content provider. The lack of support for sensemaking is why many people keep pencil and paper near their computer to take handwritten notes as they perform research online.

Sensemaking as a process has been studied for many years. In the early 1990s, researchers recognized the importance of understanding sensemaking behavior when designing knowledge representational tools, information retrieval systems, and user interfaces, see, for example, D. M. Russell et al., "The cost structure of sensemaking," In ACM CHI, 1993. Closely related, information foraging theory, see, for example, P. Pirolli et al., "Information foraging," Psychological Review, Vol. 106, pp. 643-675, 1999, was proposed to help understand how users adapt to technology when performing information seeking and consumption tasks.

More recently, this area of study has received additional attention. In particular, a renewed focus on sensemaking has developed within the intelligence analysis domain, see, for example, D. Gotz et al., "A study of information gathering and result processing in intelligence analysis," In IUI 2006 Workshop on IUI for Intelligence Analysis, 2006, and P. Pirolli et al., "The sensemaking process and leverage points for analyst technology as identified through cognitive task analysis," In Inter. Conf. on Intelligence Analysis, 2005, and the emerging field of visual analytics, see, for example, J. J. Thomas et al., editors, "Illuminating the Path: The Research and Development Agenda for Visual Analytics," IEEE Press, 2005.

Given the recent focus on sensemaking behavior, a number of dedicated tools have emerged that aim to assist users as they organize hypotheses, stage discovered information, and illustrate conclusions to collaborators. These include commercial tools for tasks such as brainstorming, such as, for example, Mindjet Corp., "Mind Manager," www.mindjet.com, and criminal investigation management, such as, for example, i2 Incorporated, "Analyst's Notebook," www.i2inc.com. Research efforts in visual analytics have led to additional contributions that more closely integrate information exploration and knowledge management tools, see, for example, D. Gotz et al., "Interactive visual synthesis of analytic knowledge," In IEEE VAST, November 2006, and W. Wright et al., "The sandbox for analysis: concepts and evaluation," In ACM CHI, pp. 801-810, New York, N.Y., USA, 2006, ACM Press.

The standard web browser provides a set of long-standing features to support basic re-access. These include bookmarks (or favorites), the back button, and page history. More recently, researchers have explored using visual tools for managing and exposing bookmarks as iconic thumbnails, see, for example, B. Amento et al., "Topicshop: enhanced support for evaluating and organizing collections of web sites," In UIST, pp. 201-209, 2000. Other tools have extended this idea to include "link preview" features that show thumbnails of link targets as well, see, for example, N. Milic-Frayling et al., "Webscout: Support for revisitation of web pages within a navigation session," In IEEE/WIC Inter. Conf. on Web Intel-

*ligence,* 2003. Studies have shown that tools which organize bookmarks as thumbnails can improve user performance during certain tasks, see, for example, A. Aula et al., "Information search and re-access strategies of experienced web users," In *Inter. WWW Conf.,* 2005.

It has also been shown that cross-session capabilities are important because information tasks very often span more than just a single browsing session, see, for example, N. Jhaveri et al., "The advantages of a cross-session web workspace," In *CHI Extended Abstracts,* pp. 1949-1952, New York, N.Y., USA, 2005, ACM Press. Cross-session re-access is also supported by the less-graphical Google Notebook tool, Google Notebook, http://www.google.com/notebook/, which adds the ability to share information and gain access to the work of others.

Exploiting user behavior on the web has become an important topic in recent years. The power of large crowds has been exploited in several ways, including social bookmarking, see, for example, T. Hammond et al., "Social bookmarking tools: A general review," In *Digital Library Magazine,* Vol. 11, Nature Publishing Group, 2005 and tagging tools, see, for example, M. Dubinko et al., "Visualizing tags over time," In *Inter. WWW Conf.,* 2006. However, while global knowledge across user populations can certainly be exploited during sensemaking tasks, a critical component is how to take advantage of an individual's unique progress on a specific task, not the consensus behavior of a crowd.

Personalized search is perhaps the most active area of research into personalization, see, for example, G. Rossi et al., "Designing personalized web applications," In *Inter. WWW Conf.,* 2001. These tools incorporate implicit [G. Jeh et al., "Scaling personalized web search," In *Inter. WWW Conf.,* 2003; R. Kraft et al., "Searching with context," In *Inter. WWW Conf.,* 2006; U. Lee et al., "Automatic identification of user goals in web search," In *Inter. WWW Conf.,* 2005; and K. Sugiyama et al., "Adaptive web search based on user profile constructed without any effort from users," In *Inter. WWW Conf.,* 2004] or explicit [P. Ferragina et al., "A personalized search engine based on web-snippet hierarchical clustering," In *Inter. WWW Conf.,* 2005; and Z. Wen et al., "Context-aware, adaptive information retrieval for investigative tasks," In *To Appear in Inter. Conf on IUI,* 2007] user behavior to improve the set of results returned from a search. Personalized search techniques can be extremely valuable in sensemaking. Other research has examined cross-site personalization for procedural tasks using script-by-example techniques; see, for example, A. Faaborg et al., "A goal-oriented web browser," In *ACM CHI,* pp. 751-760, New York, N.Y., USA, 2006, ACM Press.

Relocation is a common event that families must face after a change in employment. Moving to a new and unknown city can be a stressful and complex task that requires careful research and attention to detail. Before choosing where to live in a new place, it is important to learn as much as possible about the area.

Like many tasks, there are several standard questions that are broadly applicable: Where are the best public schools? Which towns or cities are unsafe? Are there high traffic areas that can impact my commute? What are typical home prices in the area? These are questions that a real estate portal would try to help answer.

In addition, however, there are likely to be questions that address needs that are unique to a particular person. Which neighborhoods have my kind of religious institution? Which communities have a sizable population of my ethnic group? Are there adult soccer leagues that I can join? Which hospitals have specialists that can treat my child's rare disease?

Answering all of these questions in a comprehensive way is a long term, non-procedural task that requires reasoning over information gathered from many different sources. For example, simply finding out which communities have sizable ethnic populations can require web searching across several sites. Comparing the locations of those communities with possible work locations and commute times requires even more research and information correlation.

Harder still is the discovery of serendipitous connections that a user might not be explicitly trying to find. For example, discovering that one particular street has not only a religious institution, but also soccer fields and a large hospital can be very difficult, particularly if the user's search for each set of information occurs days apart.

The relocation scenario described above is a prime example of how current web tools are invaluable for finding relevant information, yet insufficient for completing a sensemaking task. Search engines and content providers make all sorts of information accessible and discoverable, but there are few tools for gathering and organizing information from multiple sources into a single workspace to facilitate insight and improve the chances for serendipitous discovery.

A web-based tool designed to support this type of sensemaking scenario would be most effective if it met the following requirements:

Site Independence: A sensemaking tool should be independent of any particular site. As the example above indicates, no single content provider can host every piece of information relevant to a sufficiently complex task. Therefore, any tool designed to support sensemaking should work across all web sites accessed by the user.

Capture of discovered information: Capturing information, such as hospital locations and school rankings, can allow them to be reviewed later in time as additional information is discovered. This is especially important for long-term tasks where recall can be difficult.

Capture of insight: Users create new knowledge during sensemaking tasks. For example, the user in the scenario discovered a street with several strong qualities, including a hospital, soccer fields, and a religious facility. Tools for recording this discovery, which doesn't exist on any single web page, allow users to organize captured information in the context of their own thoughts.

Assistance in connection discovery: The long-term and multi-topic properties of sensemaking tasks pose a challenge to users that must discover connections between what has already been discovered and what is currently being explored in their browser. In the scenario, for example, it could be difficult for the user to recall that the street with the best hospital is the same street with soccer fields if the user's searches for each type of information were performed a week apart. A sensemaking support tool should help increase the odds that this sort of connection is discovered.

A web-based environment that meets the above requirements, coupled with existing web technologies for information seeking and browsing, would be a powerful tool to support complex sensemaking tasks.

SUMMARY OF THE INVENTION

In accordance with the aforementioned and other objectives, the embodiments of the present invention are directed towards methods and apparatus for assisting with sensemaking tasks when using a web-based application.

For example, in one aspect of the present invention a method is provided for assisting in the organization of information accessed through a web browser. At least one item of information accessed through the web browser is captured and visually represented in a defined organizational area of a display. A relevance index is calculated for each item of information that is visually represented to a current web-browsing behavior. The relevance index is conveyed for each item of information to the current web-browsing behavior to a user of the web browser.

In accordance with the embodiments of the present invention, an extension to the standard web browser interface is provided that is designed specifically to assist in sensemaking tasks, and will be referred to herein as a scratchpad. The scratchpad provides tools for users to capture both user-created insight as well as information found on the web while completing a sensemaking task. Captured information is visually displayed to the user for their own review and re-access. More importantly, the captured information is exploited algorithmically to help users "connect the dots" as they go about their research activities.

The scratchpad offers two primary contributions. First, it provides a set of graphical interaction tools and a graph-based data model which, taken together, allow a user to easily capture, represent, and manipulate information at various granularities and from any web site. Second, it defines both an algorithm and user interface technique for calculating and conveying the relevance of previously captured information to a user's current browsing behavior.

A key feature of the scratchpad is its ability to help "connect the dots" during a sensemaking task by comparing the user's web browsing activity with a recording of what the user has found during previous stages of work.

The scratchpad uses iconic thumbnails to represent traditional bookmarks, but expands the set of objects that can be saved to include objects of finer granularity including images, text snippets, and RSS feeds. The scratchpad also provides additional capabilities for organizing and arranging captured information. Finally, the scratchpad algorithmically exploits the captured information to help the user perform their task as they browse the web, whereas previous tools only passively stored user bookmarks.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a diagram illustrating link creation in the scratchpad, according to an embodiment of the present invention;

FIG. 7 is a table illustrating the context graph data model, according to an embodiment of the present invention;

FIG. 10 is a flow diagram illustrating a scratchpad system, according to an embodiment of the present invention.

DETAILED DESCRIPTION OF PREFERRED EMBODIMENTS

As will be illustrated in detail below, the embodiments of the present invention introduce techniques for assisting in the organization of information accessed through a web browser, and more specifically, assisting with sensemaking tasks in web-based applications.

The scratchpad is an extension to the traditional browser interface which allows users to capture information they find while researching a particular topic. The captured information can then be used to allow a user to re-access their stored information, such as, for example, as with traditional bookmarks, and to facilitate automated algorithms that can highlight hidden connections that users might otherwise overlook.

Figure 1:
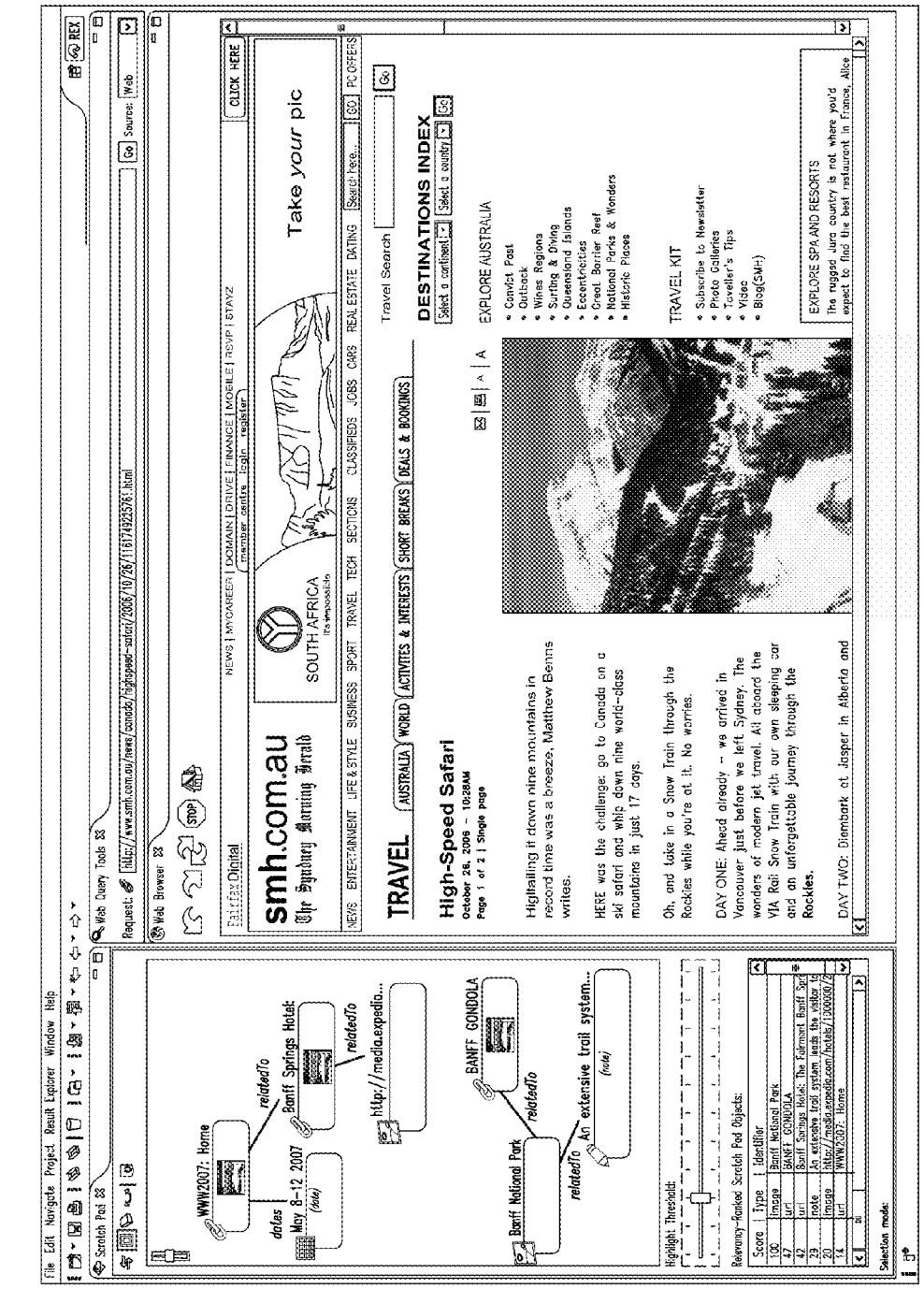
FIG. 1 is a screenshot showing a web browser enhanced with the scratchpad, according to an embodiment of the present invention.

The scratchpad is designed to store, organize, and display the information collected over the course of a sensemaking task. The scratchpad is presented to the user as a re-sizable vertical sidebar to the left of the main browser display area. Referring initially to FIG. 1, a screenshot shows a scratchpad-enabled browser, according to an embodiment of the present invention. The scratchpad is being used to investigate recreation opportunities in and around Banff National Park in Canada as part of a vacation planning exercise. The side-by-side display of the scratchpad and browser allows users to quickly move between the two spaces.

Users of the scratchpad have access to several tools for interactively creating and manipulating objects within the workspace. There are also tools for visually browsing through the collected information, as well as for re-visiting captured objects within the browser.

Users of the scratchpad can record information they discover while browsing the web by creating new objects within the scratchpad workspace. Users can create objects using any one of several different methods.

The first method for creating a new object in the scratchpad is snapshotting. As with Bookmarks or Favorites in traditional browsers, snapshotting records the URL and title of the current page. However, snapshotting goes further by recording additional information about the current page. Along with the URL, the scratchpad records (1) a graphical image of the browser's rendering of the page, and (2) a copy of the page's textual content.

Figure 2A:
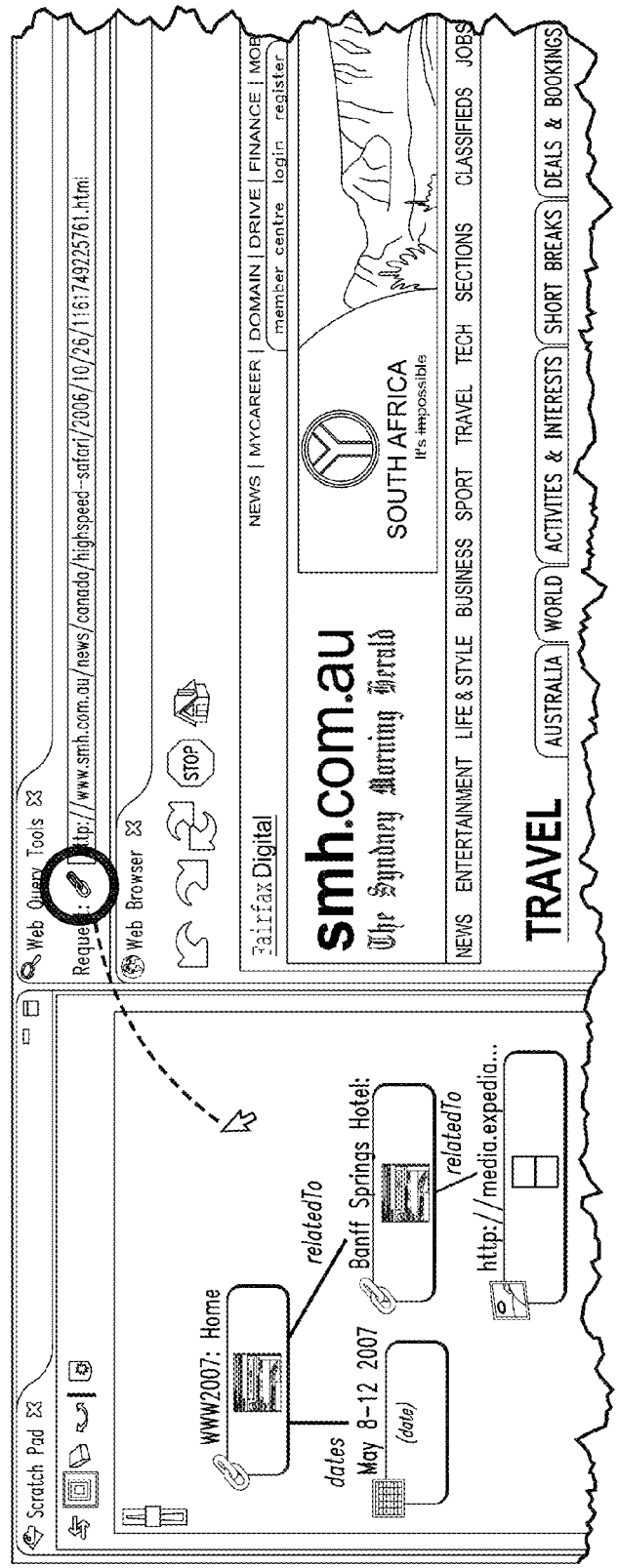
FIG. 2*a* is a screenshot showing a snapshot, according to an embodiment of the present invention.

Users create a new snapshot by dragging an icon from the URL bar above the browser and dropping it on the scratchpad. Referring now to FIG. 2*a*, a screenshot shows the creation of a new snapshot, according to an embodiment of the present invention. Once the snapshot is completed, an iconic representation of the snapshot is displayed on the scratchpad. The visual depiction includes both the page title and a thumbnail of the captured page rendering. Unique to the scratchpad is the storage of the textual content of the captured page. This information is exploited by the relevance detection algorithm as described below.

Figure 2B:
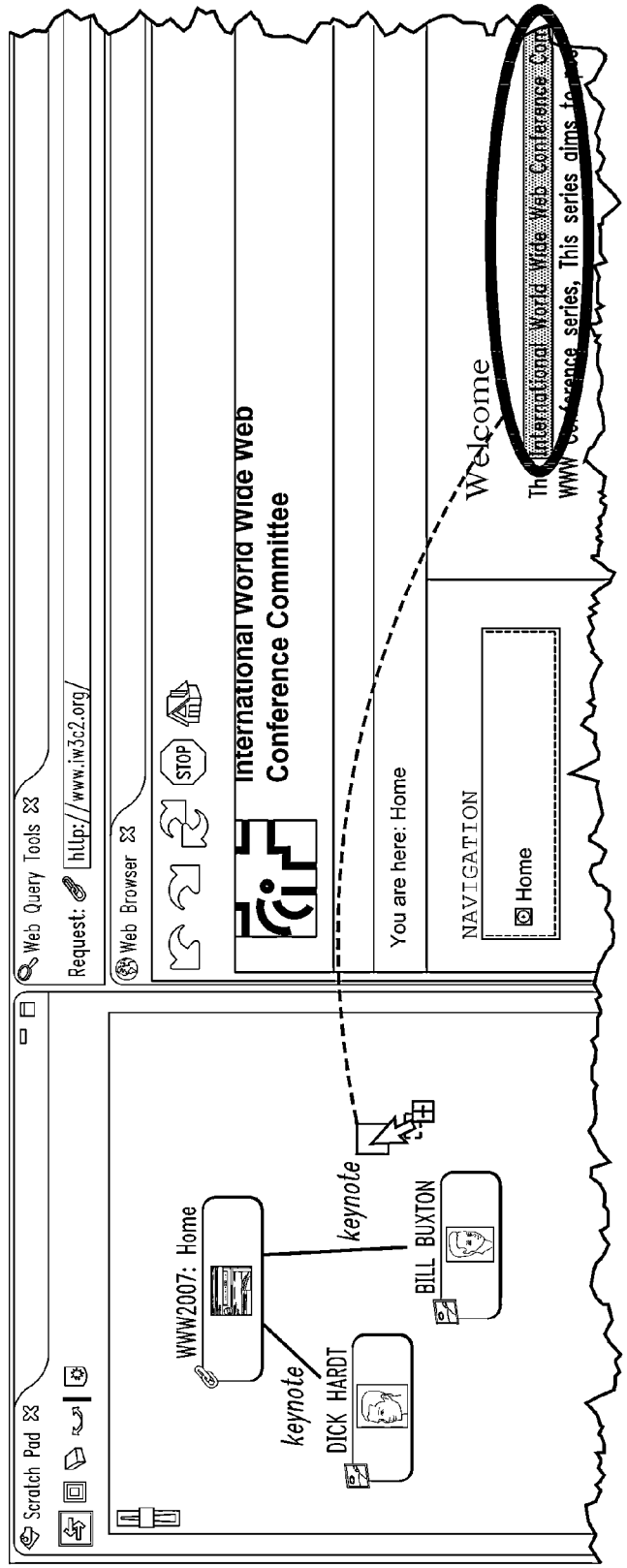
FIG. 2*b* is a screenshot showing data capture, according to an embodiment of the present invention.

In addition to snapshotting entire pages, the scratchpad allows users to collect information at a much finer granularity. For instance, users can "drag-and-drop" individual links, images, or text fragments from a web page into the scratchpad. These actions trigger the creation of new objects as well. Referring now to FIG. 2b, a screenshot shows a user dragging a snippet of text into the scratchpad for future reference, according to an embodiment of the present invention.

Figure 3:
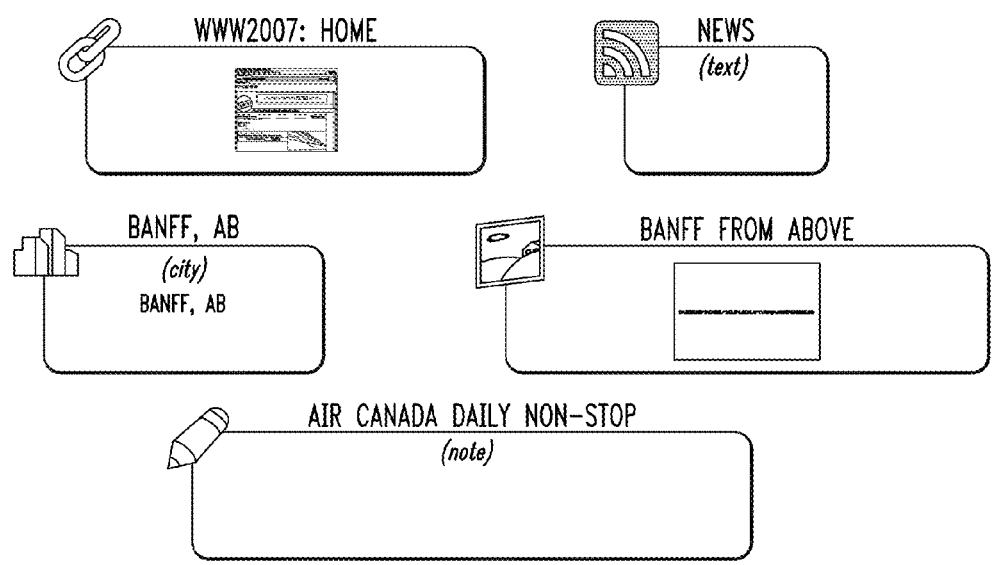
FIG. 3 is a diagram illustrating common types of objects in the scratchpad, according to an embodiment of the present invention.

When a drop event is detected within the scratchpad, the system response depends upon the type of information being dragged. By default, hyperlinks are captured as bookmarks and represented visually by an object in the scratchpad. However, the scratchpad can detect certain types of special links, such as RSS feeds, and handle them appropriately. Dragged images are displayed as thumbnails in the scratchpad and are labeled with the corresponding ALT text if available. Captured text is shown as a text note within the scratchpad. The scratchpad can be configured to recognize some basic types of text, such as cities, such as, for example, "Banff, AB," and store them as unique types of data. Referring now to FIG. 3, a number of common scratchpad types are shown, according to an embodiment of the present invention.

Users are also able to create new objects in the scratchpad from scratch, without selecting and dragging anything from the browser. A toolbar at the top of the scratchpad allows users to create arbitrary new objects using a dialog box. These objects can be used to help organize information captured from the browser, such as, for example, creating folders, or to express insight created by the users themselves as the sensemaking task evolves, such as, for example, a text note from the vacation planning task for "The Banff Gondola is expensive, but several people say it is worth it. Plus, it's on the way to the hotel."

In addition to creating new objects, users can alter existing items. Users are provided with two tools for the manipulation of scratchpad objects. First, objects can be modified by altering stored properties. Second, objects can be linked (and unlinked) to express relationships to other objects on the scratchpad.

The modification capability of the scratchpad is analogous to the functionality of traditional bookmark organization tools which allow you to modify titles and contents of bookmarked items. However, objects in the scratchpad have additional properties that can be modified, such as the type of an object. The data model used within the scratchpad and the properties associated with each object are defined below.

The second scratchpad capability is more unique. Users are able to express relationships between pairs of objects by linking them. For example, a user might decide that two web pages are related to each other, or that a particular location object is related to a captured image. Links are created by dragging one object and dropping it on top of another. After the drop, a link is defined between the two objects and is visually displayed on the scratchpad. Referring now to FIGS. 4a-4c, a link action is illustrated, according to an embodiment of the present invention. Users may also select and remove links that are no longer wanted.

Figure 5A:
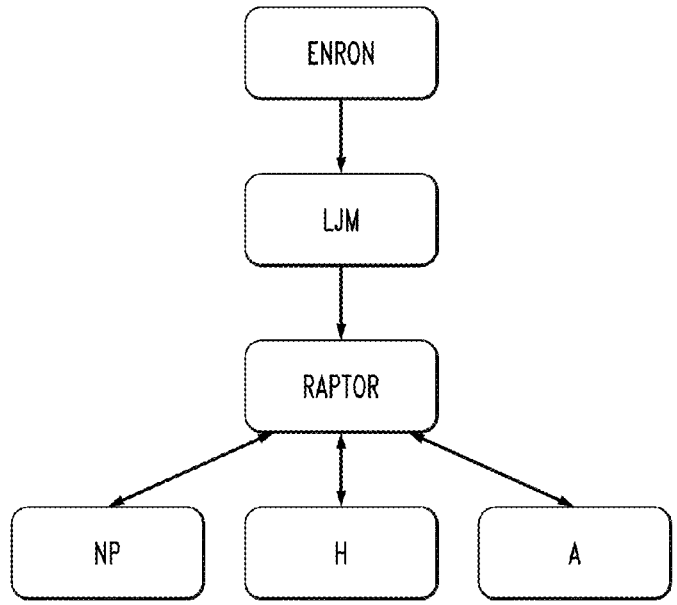
FIG. 5 is a diagram illustrating notes from user study, according to an embodiment of the present invention.
Figure 5B:
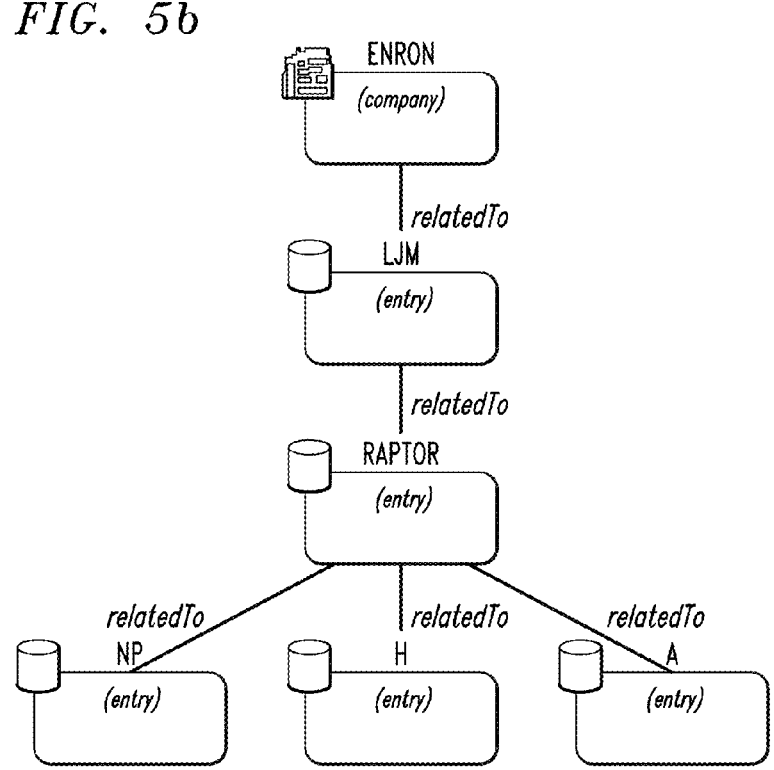

Link relationships between nodes serve two purposes. First, links allow users to record relationships between entities in the scratchpad as they are discovered, the same way they might be using pencil and paper. This behavior is patterned after the handwritten notes shown in FIGS. 5a-5b which are actual notes observed during a user study exploring information gathering and sensemaking behavior, see, D. Gotz et al., "A study of information gathering and result processing in intelligence analysis," In *IUI* 2006 *Workshop on IUI for Intelligence Analysis*, 2006.

Second, user defined links are exploited by the automated relevance algorithm. Using the structure of the scratchpad data model, the relevance algorithm helps detect overlooked connections between a user's scratchpad notes and the current web page being displayed in the browser.

Figure 6A:
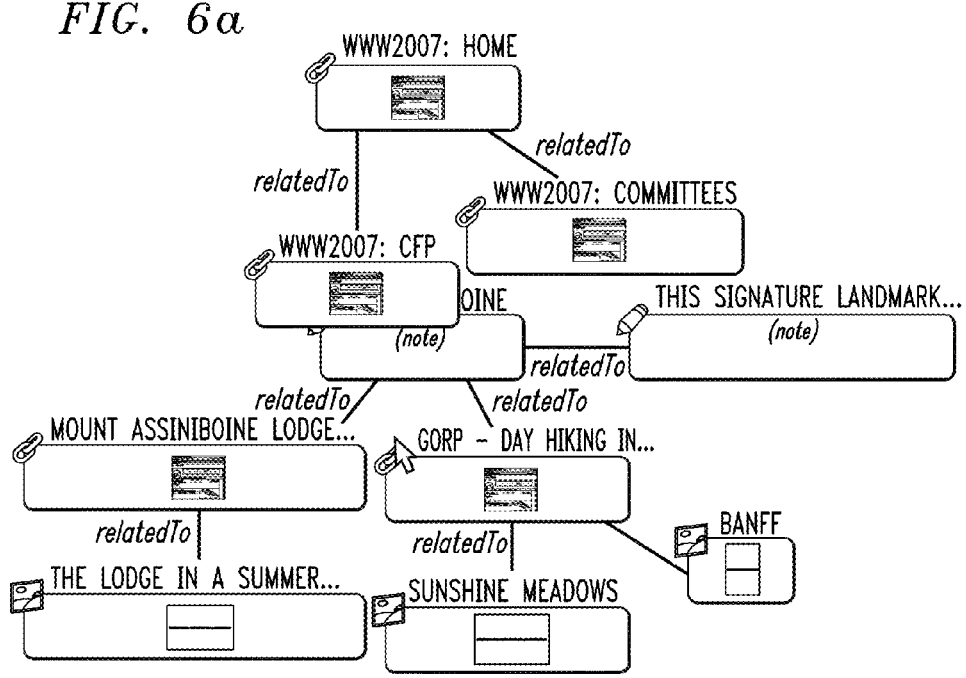
FIG. 6 is a diagram illustrating object manipulation in the scratchpad, according to an embodiment of the present invention.
Figure 6B:
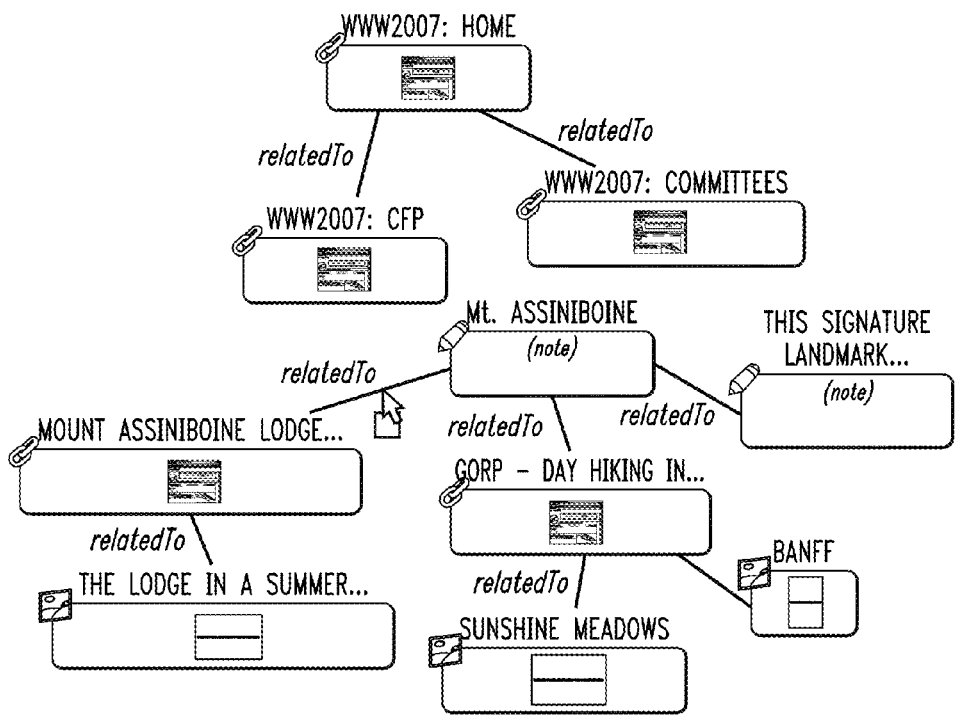

The scratchpad allows users to interactively browse and manipulate their stored information. Individual objects are arranged spatially using a desktop metaphor, allowing users to drag items around to form organizational clusters of nodes for various topics of investigation. Users can select individual or sets of objects and drag them to new locations. In addition, the scratchpad has a nudge tool, illustrated in FIGS. 6a-6b, which allows the user to push nodes away from a specific spot to open additional space on the scratchpad, just as you might push papers to the side to make room on your physical desk.

The scratchpad supports browsing by providing zoom and pan tools. Users can zoom in to small regions of the scratchpad for detailed views of sub-regions, or zoom out to get an overview of the entire scratchpad. They can also use the pan tool to translate the ScratchPad both vertically and horizontally.

Finally, the scratchpad provides an itemized list of objects located below the graphical desktop view. This list is sortable based on several attributes, both native, such as object type, as well as derived, such as the relevance score computed by the algorithm. The itemized list acts as an index into the scratchpad space. After finding an item in the list, users can click on the item to re-center the spatial view on the selected item.

One of the primary uses for the scratchpad is re-visitation. Users can easily return to a URL snapshot by simply dragging the snapshot object from the scratchpad into the main browser pane. Similarly, users can open links saved on the scratchpad by dragging them to the browser.

More sophisticated behavior is made possible by the scratchpad's URL build script feature. Unique scripts can be defined for each type of object in the ScratchPad. Build scripts create custom URL patterns based on the object type so that each variety of scratchpad object can be viewed using type-appropriate web sites.

For example, when RSS feeds are dragged from the scratchpad to the browser, the feed address can be inserted into the URL format of a generic feed-reader, such as, for example, Google's Reader, http://www.google.com/reader/view/. Similarly, a URL build script could translate location objects in the scratchpad, such as, for example, Banff, AB, into the URL format of a map service, such as, for example, Yahoo Maps, maps.yahoo.com, when users drag the location object from the scratchpad into the browser.

Finally, objects can be dragged individually or as sets into the browser's search box to compose search terms using captured objects.

The scratchpad allows users to record information at several levels of granularity and provides tools for their creation and manipulation. Underneath the graphical display of the user's collection of information is a data structure that mirrors the graph-like visual presentation. The data structure is called a context graph because it is a graph-based representation of a user's web-browsing context. Referring now to FIG. 7, a table illustrates a context graph data model, according to an embodiment of the present invention. A context graph, noted as C, is designed to capture a user's explicit note-taking behavior throughout a sensemaking task.

A context graph C is a disconnected graph defined by a set of nodes, $N_C$, and a set of edges, $E_C$. Each node $n_i \in N_C$ corresponds to an object explicitly added to the scratchpad by a user. Similarly, each edge $e_i \in E_C$ corresponds directly to a user-created link. Nodes and edges define the backbone of the context graph data model and all other properties are attached to these primary structures.

Nodes represent atomic units of information captured by a user within the graph. Each node $n_i$ has several important properties. These properties define the local node itself, the overall structure of the context graph, and store values computed algorithmically by the scratchpad system. There are three attributes which represent the node's local properties: type, identifier, and content. All three properties are populated at the time a node is instantiated.

The type of a node, noted as Type$\{n_i\}$, is initially assigned during the creation of the node and depends upon the user interaction that spawned its creation. For example, the snapshot of a page will create a node of type url. In contrast, dragging an image from a web page into the scratchpad will create an object of type image. The type is mutable and may be set to any arbitrary type at any point in time. However, at the application level, the scratchpad does impose certain restrictions to ensure compatibility between the type of a node and its content.

Nodes also have an identifier, noted as Id$\{n_i\}$. Identifiers act as textual summaries of an item. For example, a snapshot node would have the identifier set to the title of the web page. In contrast, an image node would have the identifier set to the ALT attribute assigned to the image in the corresponding web page. As with the type, identifiers are mutable and users may explicitly modify their value.

The content of a node, noted as Con$\{n_i\}$, stores the data content of the captured item. The specific data placed in this field depends upon the type of object. For example, a node with type Note will set Con$\{n_i\}$ to a text string, while a node of type Image will store the actual image data.

The structure of the context graph is represented by edge lists stored at every node. Each node maintains a list of edges that are incident to it. The edge list for node $n_i$ is noted as Edges$\{n_i\}$.

The two remaining node attributes store scalar values which are calculated and maintained by the system itself. The first attribute is similarity, noted as Sim$\{n_i\}$. The second attribute is relevance, noted as Rel$\{n_i\}$. Both of these attributes and the algorithm that computes them are defined below.

Context graph edges are created when users interactively link two objects within the scratchpad. An edge therefore expresses a relationship between a pair of nodes. Edges are bi-directional and each of the two nodes associated with an edge is considered equal. The pair of nodes for edge $e_i$ is defined as Nodes$\{e_i\}=\{n_j, n_k\}$ where $n_j, n_k \in N_C$. The value of Nodes $\{e_i\}$ is immutable for the life of an edge. If changes are required, the edge must be removed from the context graph and a new one defined.

Edges have one additional attribute: a type, noted as Type$\{e_i\}$. However, unlike node types, the type of an edge is purely for human use and can be used to help organize a user's scratchpad. Edge types are displayed as labels in the visual presentation of the context graph but are not incorporated into any of the scratchpad's automated processes. Edge types are mutable and can be changed by a user at any time by interacting with the scratchpad workspace.

One of the key features of the scratchpad is relevance detection. As a user browses the web in search of new information related to their task, the scratchpad employs an algorithm that compares the information stored in the tool's context graph with the content of the web browser. As connections are found, the degree of relevance is conveyed visually to the user.

Relevance detection is an important part of the scratchpad's ability to support sensemaking tasks. It assists users in "connecting the dots" by notifying the user about potentially relevant connections between their scratchpad and their current focus in the web browser. This feature can prove especially useful in uncovering hidden or unexpected connections which a user would not normally examine on their own.

The scratchpad is designed to estimate the relevance between a user's previous work, captured within the scratchpad, and their current focus of exploration, the contents of the web browser. Before defining the relevance metric and algorithm, it is important to clarify the distinction made between similarity and relevance.

Similarity is a measure of sameness. Two items are considered highly similar when they are nearly identical. For this reason, one person's tennis shoes are quite similar to a stranger's running shoes. However, the two sets of shoes are largely irrelevant to each other.

In contrast, relevance is a measure of connectivity. Two items are considered highly related when they have a close connection. For example, a person's socks are related to the same person's shoes even though they are not at all similar. It is the connection between the socks and shoes, via the person, which make them relevant to one another.

Critically, similarity is an important part of relevance. In the above example, the person owning the socks and the person owning the shoes are highly similar (in fact, they are the same person). It is that similarity which connects the socks to the shoes, making them relevant to one another. It is relevance that the scratchpad attempts to detect by exploiting the structure and content of the context graph.

The relevance detection feature of the scratchpad is built upon a metric which calculates an estimate of the strength of the relationship between a single context graph node, $n_i$, and a segment of plain text, t. The metric is defined as the function $\rho(n_i, t)$ which returns a scalar value equal to or greater than zero. A large $\rho$ value signals a high degree of relevance, while a value of zero indicates the absence of any relationship.

Before defining the relevance metric itself, there are two helper functions which are critical to the relevance evaluation. These are (1) a node-text similarity function and (2) a neighborhood operator.

The relevance metric requires a function to evaluate the similarity between a context graph node $n_i$ and a segment of text t. This function, noted as $\sigma(n_j, t)$, is defined in Equation 1.

$$\sigma(n_j, t) = \text{Similarity}(\text{ToText}(n_j), t) \qquad (1)$$

where Similarity and ToText are functions as described below.

The scratchpad employs a very basic but very fast similarity function, Similarity($t_1, t_2$), which compares two text segments, $t_1$ and $t_2$, by examining the co-occurrence of individual terms and assigning a similarity value based upon each shared word's frequency of use within the British National Corpus, Oxford University Computing Services, "British national corpus," www.natcorp.ox.ac.uk/.

Because the text similarity function compares two segments of text, the node $n_j$ must be converted to a text representation prior to employing the similarity measure. This is performed by ToText, which concatenates the identifier Id$\{n_j\}$ with the content Con$\{n_j\}$ if the content can be converted to text. Otherwise, only Id$\{n_j\}$ is used.

For example, a node representing a snapshot of a web page would be converted to text by concatenating the title of the page with the textual content of the page body. In contrast, a node representing a captured image would be converted to text by taking only the Id$\{n_j\}$ value, which for an image is populated by default with the image's ALT text attribute.

The relevance metric is defined upon the neighborhood of a node, taking into account the structure of the context graph as represented by the sets Edges $\{n_j\}$ for each $n_i \epsilon N_C$. This notion is captured within the relevance metric by defining the lth neighborhood of a node, $\delta(n_j, l)$, to be the set of nodes whose shortest path to $n_j$ is exactly l edges long. The definition is presented formally in Equation 2.

$$\delta(n_j, l) = \{n_k : n_k \in N_C \text{ and } \text{Dist}(n_j, n_k) = l\} \quad (2)$$

where $$\text{Dist}(n_j, n_k) = \begin{cases} |n_j \to n_k|, & \text{if } \exists \text{ a shortest path } n_j \to n_k, \\ \infty, & \text{otherwise,} \end{cases}$$

The ρ Relevance Metric. The ScratchPad's relevance metric is defined using the building blocks described above. The metric $\rho(n_i, t)$, which measures how related a node $n_i$ is to a segment of text t, is defined as follows:

$$\rho(n_i, t) = \sum_{l=0}^{L} \left( \sum_{n_j \in \delta(n_i, l)} D^l \sigma(n_j, t) \right) \quad (3)$$

where $L \epsilon [0, \infty)$ and $D \epsilon (0, 1]$ are constants. L is the maximum neighborhood size incorporated into the metric and D is a decay factor which determines the degree to which the σ values of distant nodes propagate and contribute to the overall relevance metric.

Conceptually, $\rho(n_i, t)$ estimates the relevance between $n_i$ and t by summing the similarity between t and the text version of every node $n_j$ within the first L neighborhoods of $n_i$. Each node $n_j$'s contribution is decayed by its distance from $n_i$ as measured by the shortest path connecting the pair.

The scratchpad's relevance detection algorithm iteratively estimates the relevance of each object in the scratchpad to the page being displayed within the web browser. Every time a user visits a new page, the relevance algorithm begins a new round of evaluation. On each iteration, the algorithm traverses the context graph data structure, compares each node $n_i$ with the plain text content of the HTML page loaded within the browser, t, and updates the numerical relevance score associated with each node, $\text{Rel}\{n_i\}$.

The ρ relevance metric defined earlier in this section provides a formal definition for the scratchpad's measure of information relevance. However, directly applying the metric iteratively to all nodes $n_i \epsilon N_C$ would be extremely inefficient because the $\sigma(n_i, t)$ function would be calculated repeatedly for each node in a context graph except for the special case where $E_C = \emptyset$. The scratchpad therefore employs a more efficient algorithm which caches the intermediate similarity results of $\sigma(n_i, t)$ in $\text{Sim}\{n_i\}$. The $\text{Sim}\{n_i\}$ value can then be reused across all ρ calculations for a given value of t.

The scratchpad's relevance detection feature is designed to assist users as they perform sensemaking tasks by continuously analyzing the context graph in search for connections that the human user may have overlooked. Therefore, a critical complement to the relevance algorithm is the method used to convey the results back to the user.

The scratchpad provides two mechanisms for displaying the estimated relevance values. First, parameterized object highlighting within the graphical scratchpad display enables qualitative, "at-a-glance" detection of relevant regions of the context graph. Second, a sortable table presentation of the scratchpad objects allows users to examine the relevance score assigned to each node quantitatively.

The scratchpad interface displays the relevance score assigned to each node by highlighting the graphical objects in various shades of green. Stronger green tones indicate qualitatively that a node has a stronger relevance to content displayed within the web browser. In contrast, less intense highlights indicate a weaker relevance score. The highlight intensity is updated dynamically as the relevance algorithm produces new values each time a user browses from one web page to the next.

The highlighting behavior is evident in FIG. 1, where a user is reading a web page about winter sports in the Canadian Rockies as part of their research task exploring a trip to Banff for the WWW 2007 conference. The most relevant nodes deal with Banff National Park, a gondola attraction, and some hiking trails. Also shaded green is a node for the Fairmont Banff Springs Hotel. Just as importantly, nodes corresponding to the conference web page and dates are not highlighted, indicating at a glance which portion of the user's previous work is most relevant to the page currently being viewed.

Figure 8A:
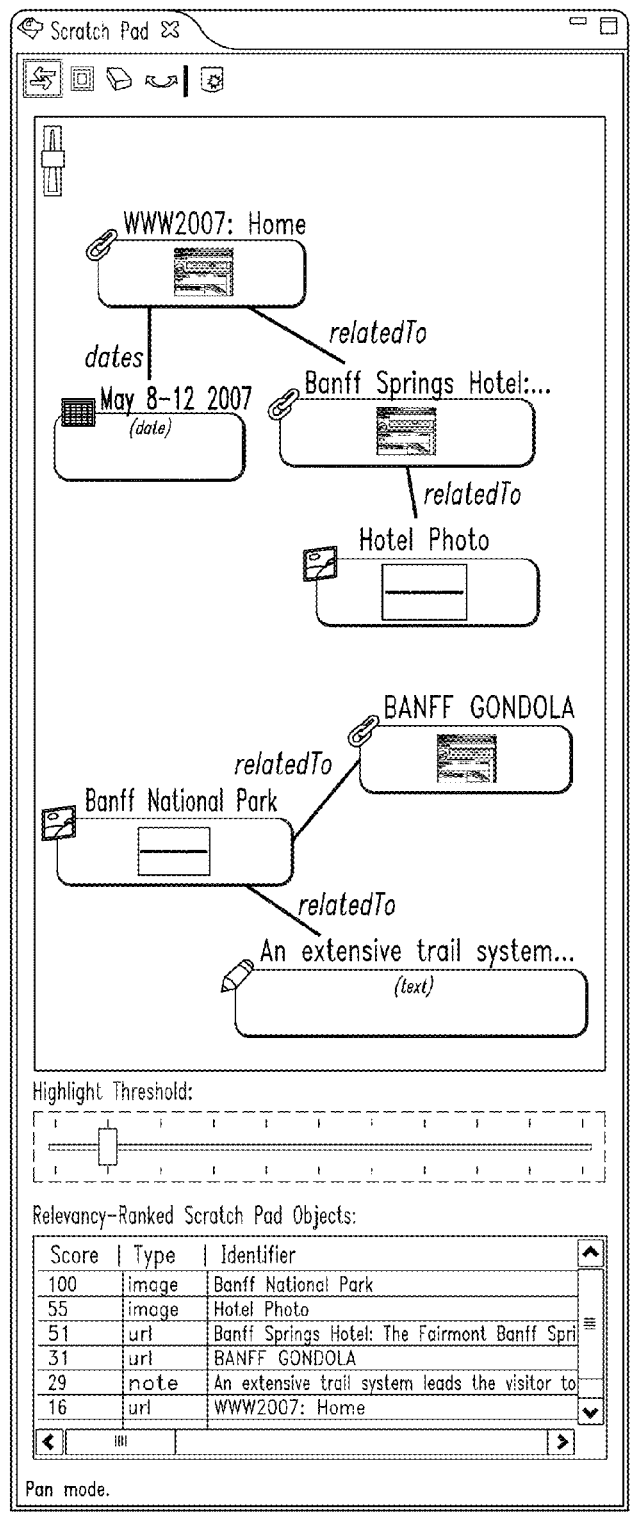
FIG. 8 is a screenshot showing relevance sensitivity in the scratchpad, according to an embodiment of the present invention.
Figure 8B:
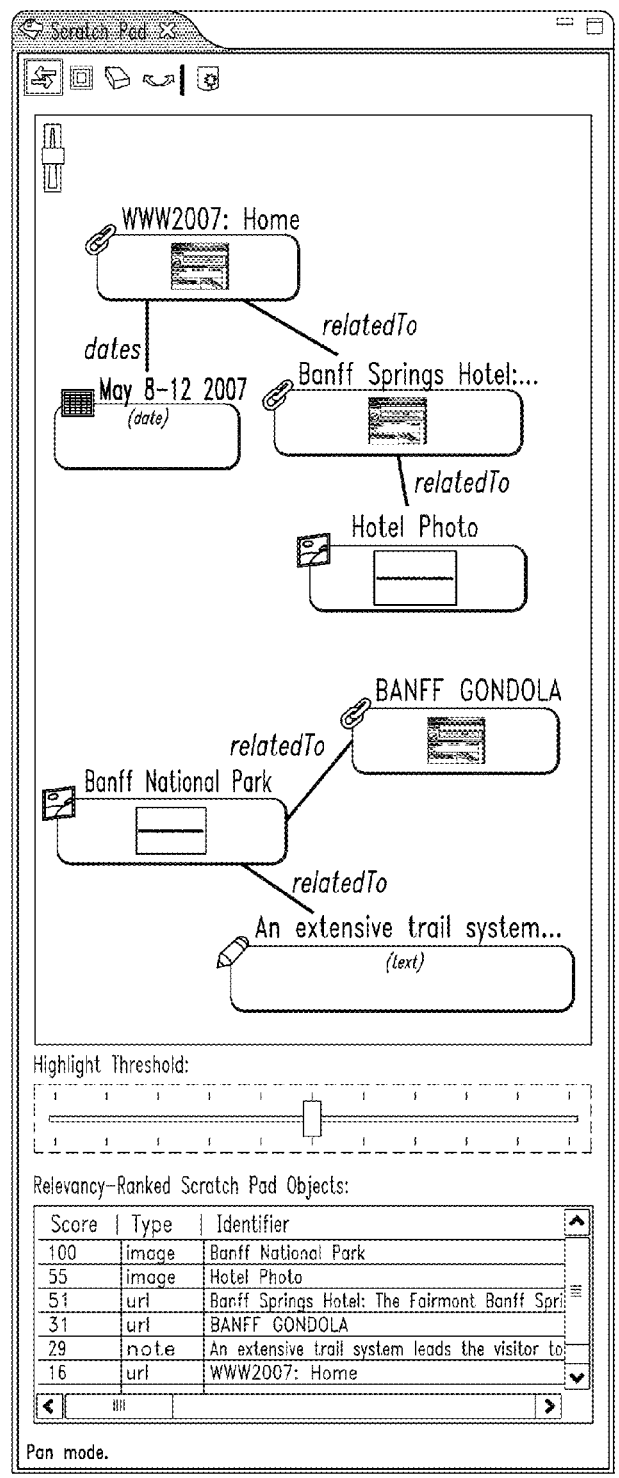

The highlighting behavior is parameterized with a sensitivity factor to give users control over how aggressive the scratchpad should be in illuminating related nodes. The user interface provides a slider just below the graphical region of the scratchpad to let users easily adjust the sensitivity. Referring now to FIGS. 8a-8b, a screenshot shows the scratchpad with two different sensitivity settings, according to an embodiment of the present invention.

After each iteration of the relevance detection algorithm, new highlight intensities are calculated for each visual object in the scratchpad. The intensity for node $n_i$ is governed by the following formula:

$$\alpha_i = \left( \frac{\rho(n_i, t)}{\rho_{max}} \right)^\gamma \quad (4)$$

where $\alpha_i$ is the highlight intensity for node $n_i$, $\gamma$ is the sensitivity parameter, and $\rho_{max}$ is the maximum value of $\rho(nj, t)$ for all $n_j \epsilon N_C$.

The value of each ρ is normalized by dividing by $\rho_{max}$, which maps each relevance value to the range [0, 1]. The value of γ can have any value in the range $[0, \infty)$. However, in practice, this value is tied directly to the position of the GUI's sensitivity slider, which imposes a fixed range on γ. Based on empirical observations, the current tool limits the γ value to the range [0, 10].

The scratchpad also provides a quantitative presentation of the relevance data to complement the qualitative nature of the highlight-based graphical display. Below the sensitivity slider, the scratchpad provides a tabular presentation of the data. Each row in the table corresponds to a single $n_i \epsilon N_C$. For each row, there are three columns which display (1) a normalized relevance score based on $\text{Rel}\{n_i\}$, (2) the type $\text{Type}\{n_i\}$, and (3) the identifier $\text{Id}\{n_i\}$.

The table can be sorted by any of the three columns. Sorting by relevance provides access to the quantitative relevance results and enables quick determination of the most relevant nodes. Sorting by type or identifier allows users to efficiently locate specific nodes that may be difficult to find visually within the graphical display. Double-clicking on any line item re-centers the graphical view about the corresponding node, enabling quick transitions from table to graphics.

The scratchpad is designed to address each of the requirements for sensemaking. These include site independence, the capture of both discovered information and insight, and assistance in connection discovery. To begin evaluating how users can benefit from sensemaking tools, the scratchpad was applied to a common sensemaking task: vacation planning.

A scratchpad-enhanced browser was used to begin planning a trip to the WWW 2007 conference. The task was to research options for the trip that included both the technical conference activities as well as a few extra days of vacation to explore the surrounding area.

The user began their task by visiting the conference web site, reading about the planned activities, and using the scratchpad to save information about the conference. Saved information included the keynote speakers, the dates, and the conference web page itself.

Later, the user focused on accommodations. After visiting the web page describing the conference hotel, the user created a snapshot of the official hotel's web page: the Fairmont Banff Springs hotel. The user also dragged a couple of photographs of the hotel to the scratchpad and linked them to the other hotel information.

Deciding that the official hotel might be too expensive, the user created two new objects directly on the scratchpad: "Nice hotels" and "Value hotels." Using these two objects as organizational anchors, the user gathered information on additional options and linked them to the appropriate category.

Later in the task, the user was looking at attractions in the Banff region. After exploring information on hiking trails and parks, the user created snapshots of several interesting sites together with photographs of some mountains mentioned in the descriptions. These too were placed on the scratchpad for future review.

Figure 9:
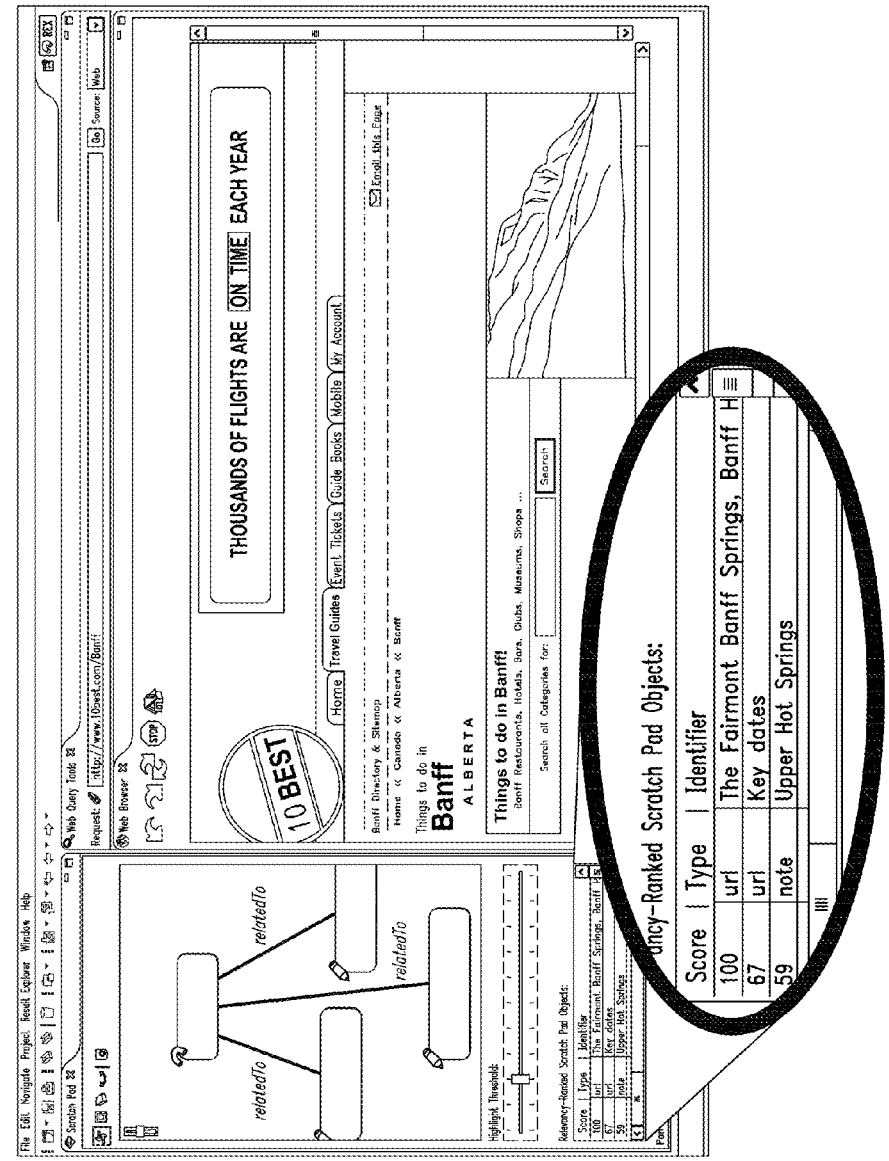
FIG. 9 is a screenshot showing a scratchpad-enhanced browser, according to an embodiment of the present invention.

The user then looked at web pages from more general travel sites describing Banff attractions to see what else there is to do in the area. On one page listing top regional attractions, the scratchpad detected a surprising connection between the active web page and the objects in the scratchpad. Ranked number one in relevance was the Fairmont Banff Springs hotel, not one of the attractions already saved by the user to the scratchpad. The hotel ranked highly because the hotel itself was listed as an attraction on the browser's web page. Referring now to FIG. 9, a screenshot shows a similar scratchpad with the same connection, according to an embodiment of the present invention.

The scratchpad provides basic functionality to meet all of the sensemaking requirements outlined above. It serves as an effective place to capture and organize information from several sources. It enables re-visitation as well as overall management of collected web pages, pictures, and text. In addition, it assists in the unexpected discoveries when the user is not directly seeking more information.

An overall scratchpad system is illustrated in FIG. 10, according to an embodiment of the present invention. A user 1002, loads a new web page 1004 thus providing the browser with current content 1006. Information is captured 1008 and a type analysis 1010 is performed in forming a scratchpad data model 1012. Context relevance is evaluated 1014 using new web page 1004, current browser content 1006, information capture 1008, and scratch pad data model 1012. Relevance is presented 1016 to user 1002.

The scratchpad allows users to capture both user-created insight as well as information found while performing their task on the web. The captured information is presented visually to the user, allowing them to review and re-access the saved information. The captured information is also exploited algorithmically to help users "connect the dots" as they continue to their research activities.

The scratchpad offers two primary contributions. First, it provides a set of graphical interaction tools and a graph-based data model which, taken together, allow a user to easily capture, represent, and manipulate information at various granularities and from any web site. Second, it defines both an algorithm and user interface technique for calculating and conveying the relevance of previously captured information to a user's current browsing behavior.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for assisting in the organization of information accessed through a web browser, comprising the steps of:
   capturing at least one item of information accessed through the web browser;
   formulating a context graph comprising the at least one captured item of information;
   providing one or more user interface features permitting a user to link the at least one captured item of information with at least one other captured item of information;
   visually representing the context graph in a defined organizational area of a display, wherein the context graph comprises a visual representation having nodes corresponding to respective ones of the captured items of information and edges corresponding to user-created links between the captured items of information;
   calculating a relevance index for at least one item of information of a current web-browsing behavior; and
   conveying the relevance index for the at least one item of information of the current web-browsing behavior to a user of the web browser,
   wherein the relevance index is based on comparing the at least one captured item of information and a neighborhood of nodes linked to the at least one captured item of information to the at least one item of information from the current web-browsing behavior to inform the user of the web browser of relevant connections between the at least one item of information and the at least one item of information of the current web-browsing behavior.

2. The method of claim 1, wherein the step of capturing at least one item of information comprises the step of dragging an icon representing a URL from a web browser to at least a designated portion of the defined organizational area of the display.

3. The method of claim 2, wherein, in the step of dragging an icon, the designated portion of the defined organizational area comprises a resizable vertical sidebar.

4. The method of claim 2, wherein the step of visually representing the context graph comprises displaying the at least one captured item of information as an iconic representation of a web page corresponding to the URL in the defined organizational area.

5. The method of claim 4, wherein the iconic representation comprises a title and a thumbnail.

6. The method of claim 2, wherein the step of capturing at least one item of information further comprises the step of storing textual content of a web page corresponding to the URL.

7. The method of claim 1, wherein the step of capturing at least one item of information comprises the step of dragging at least one of links, images and text fragments from a web browser to the defined organizational area of the display.

8. The method of claim 7, wherein the step of capturing at least one item of information comprises the step of storing text content associated with the at least one captured item of information.

9. The method of claim 7, wherein the step of visually representing the context graph comprises the step of displaying the at least one captured item of information as at least one of a thumbnail and a text note.

10. The method of claim 1, wherein the step of capturing at least one item of information comprises the step of creating a new object in the defined organizational area of the display through a dialog box of the defined organizational area of the display.

11. The method of claim 1, further comprising the step of manipulating the at least one captured item of information.

12. The method of claim 11, wherein the step of manipulating the at least one captured item of information comprises the step of altering one or more stored properties of the at least one item of information.

13. The method of claim 11, wherein the step of manipulating the at least one captured item of information comprises the step of linking the at least one captured item of information to the at least one other captured item of information in the defined organizational area.

14. The method of claim 13, wherein the step of linking the at least one captured item of information comprises the steps of:
 dragging an object visually representing the at least one captured item of information; and
 dropping the object on another object visually representing another item of information in the visual display forming a link between the object visually representing the at least one capture item of information and the other object visually representing another item of information.

15. The method of claim 11, wherein the step of manipulating the at least one captured item of information comprises the step of browsing captured items of information.

16. The method of claim 15, wherein the step of browsing captured items of information comprises at least one of zooming and panning through the captured items of information.

17. The method of claim 11, wherein the step of manipulating the at least one captured item of information comprises the step of forming organizational clusters of captured items of information.

18. The method of claim 1, wherein the step of visually representing the at least one item of information comprises the step of displaying a list of sortable attributes for each captured item of information.

19. The method of claim 1, wherein each node of the context graph comprises a type, an identifier, and content.

20. The method of claim 1, wherein the step of calculating a relevance index comprises the step of employing an algorithm that compares the context graph to content of the web browser.

21. The method of claim 20, wherein the step of employing an algorithm comprises the step of calculating an estimate of a strength of a relationship between each node and text from the web browser in accordance with a similarity function.

22. The method of claim 1, wherein the step of conveying the relevance index of each item of information comprises the step of highlighting a visual representation of each item of information in a color tone in accordance with relevance.

23. The method of claim 22, wherein, in the step of highlighting a visual representation, a stronger color tone indicates a stronger relevance for an item of information.

24. The method of claim 1, wherein the step of conveying the relevance index of each item of information comprises the step of presenting a table of quantitative relevance for each item of information.

* * * * *